(12) United States Patent
Te Wierik

(10) Patent No.: US 6,647,926 B2
(45) Date of Patent: Nov. 18, 2003

(54) APPARATUS FOR SCREENING POULTRY AT LEAST AT NIGHT FROM CRAWLING VERMIN SUCH AS FOR INSTANCE POULTRY LICE

(75) Inventor: Hendrikus Johannes Jozef Te Wierik, Raalte (NL)

(73) Assignee: Farmer-Automatic Josef Kuhlmann GmbH & Co. KG, Laer (DE)

( * ) Notice: Subject to any disclaimer, the term of this patent is extended or adjusted under 35 U.S.C. 154(b) by 0 days.

(21) Appl. No.: 10/275,836
(22) PCT Filed: May 10, 2001
(86) PCT No.: PCT/NL01/00357
§ 371 (c)(1), (2), (4) Date: Nov. 7, 2002
(87) PCT Pub. No.: WO01/84918
PCT Pub. Date: Nov. 15, 2001

(65) Prior Publication Data
US 2003/0140867 A1 Jul. 31, 2003

(30) Foreign Application Priority Data
May 12, 2000 (NL) .............................................. 1015187

(51) Int. Cl.$^7$ ................................................ A01K 31/12
(52) U.S. Cl. ........................................ 119/532; 119/533
(58) Field of Search ................................ 119/531, 532, 119/533, 57.9

(56) References Cited

U.S. PATENT DOCUMENTS

| 1,623,171 | A | * | 4/1927 | Doser | 119/531 |
| 1,684,608 | A | * | 9/1928 | Thumann | 119/533 |
| 1,850,763 | A | * | 3/1932 | Morley | 119/532 |
| D103,963 | S | * | 4/1937 | Butler | 119/531 |

* cited by examiner

Primary Examiner—Charles T. Jordan
Assistant Examiner—Elizabeth Shaw
(74) Attorney, Agent, or Firm—Merchant & Gould P.C.

(57) ABSTRACT

Apparatus intended for screening poultry at least at night from crawling vermin such as for instance poultry lice, the apparatus being provided with poultry support means (4) on which the poultry sleeps, the poultry support means being connected to the fixed world via at least one connection, which in each connection (3, 5, 10), a trap (6) is incorporated for crawling vermin, such as for instance poultry lice, so that poultry present on the poultry support means (4) is screened from the crawling vermin.

11 Claims, 5 Drawing Sheets

APPARATUS FOR SCREENING POULTRY AT LEAST AT NIGHT FROM CRAWLING VERMIN SUCH AS FOR INSTANCE POULTRY LICE

The invention relates to an apparatus for keeping poultry according to the preamble of claim 1.

Such an apparatus is known from U.S. Pat. No. 1,633,773. The known apparatus discloses a chicken-roost hanger comprising having means for preventing insects such as mites or the like from getting on the roost from the wall of the house in which the roost is mounted.

From practice an apparatus for keeping poultry is known which is provided with poultry support means on which the poultry, at least at night, rests. Such an apparatus is known per se. As a rule, such an apparatus comprises a laying nest, comprising a compartment in which it is dark and in which the poultry lays eggs which are subsequently carried off; a grid, also called bin, adjacent the compartment and on which the roosts, nipple drinkers and feeding troughs are situated, and a free-range area. Most often, the grid is located on opposite sides of the laying nest. The roosts, on which the chickens sleep, are mounted on the bin and, with the aid of supports, the grid rests on the fixed world, in this case the ground. A drawback of this apparatus is that the poultry louse, which is mostly active during the night, can simply reach the poultry to suck itself full of blood. As a result, the legs of the chickens have blooded cuts, so that the poultry often leaves blood smears on the eggs. These blood-smeared eggs are not suitable for sale in the retail business, so that the economic value of blood-smeared eggs is considerably lower.

In the existing apparatus, it is only possible to free the apparatus from poultry lice by heating the chicken coop for several days up to 65° C., which means an evacuation of the chickens, which is only possible after a full "round" of 65 weeks and entails heating costs. In the past, it was also possible to use highly toxic agents to kill the poultry lice but the use of these agents has recently been prohibited by the government for reasons of harmfulness to the environment and public health. Only exterminating agents may still be used.

An object of the invention is to screen poultry at least at night from crawling vermin, such as poultry lice.

The object contemplated is achieved with an apparatus which is characterized by the features of claim 1.

Because all parts from which the apparatus is built up, notably the poultry support means, are manufactured such and assembled in such a well-fitting manner, that, during the daytime, the chickens can free the environment from poultry lice in that the poultry lice cannot hide in cracks and the like, the poultry is able to remove poultry lice and dirt which holds poultry lice. The triangular longitudinal profiles offer the advantage that the chickens can easily reach the surfaces thereof with their legs so as to clean them. Because the height of the cross strips is such that the chickens can reach the lower side of these cross strips with their legs, the chickens can also during daytime completely free the supports of the grids from poultry lice. In this manner, formation of clusters of poultry lice underneath the grids is prevented.

Research has shown that during the day, the poultry louse is present somewhere on the fixed world, for instance in the free-range area or on the grid. When the poultry, such as, for instance, chickens, are awake and perceive the poultry louse, they eat it, and, in this manner, keep the free-range area and possibly the grid, free of poultry lice, at least when the poultry louse is in a position where it can be reached by the poultry. The poultry lice which have been hiding during the day and which have not been eaten by the chickens, try, at night, when the chickens are asleep and are not capable of keeping their direct area of residence free of poultry lice, to reach the chicken and to suck themselves full of blood.

Research has also shown that the poultry louse can only move by crawling on or against a surface while the position of the inclination of the surface is not important. The poultry louse, therefore, can walk up and down a straight wall, but also against a ceiling and, naturally, on a floor. The poultry louse cannot fly or jump.

Research has further shown that the poultry louse, to reach the poultry, can travel, during the night, in a crawling manner, a distance of 15 meters between its position on the fixed world and the poultry.

As every connection with which the poultry support means, such as, for instance, roosts, are connected to the fixed world, comprises a trap, every possible route for the crawling vermin to the support means is blocked. Hence, the crawling vermin cannot reach the poultry on the support means.

Further elaborations of the invention are described in the subclaims and will hereinbelow be elucidated on the basis of an exemplary embodiment with reference to the following figures.

FIG. 1b shows a top plan view of the apparatus represented in FIG. 1a;

In these Figures, corresponding parts are indicated with the same reference numerals.

Figure 1A:
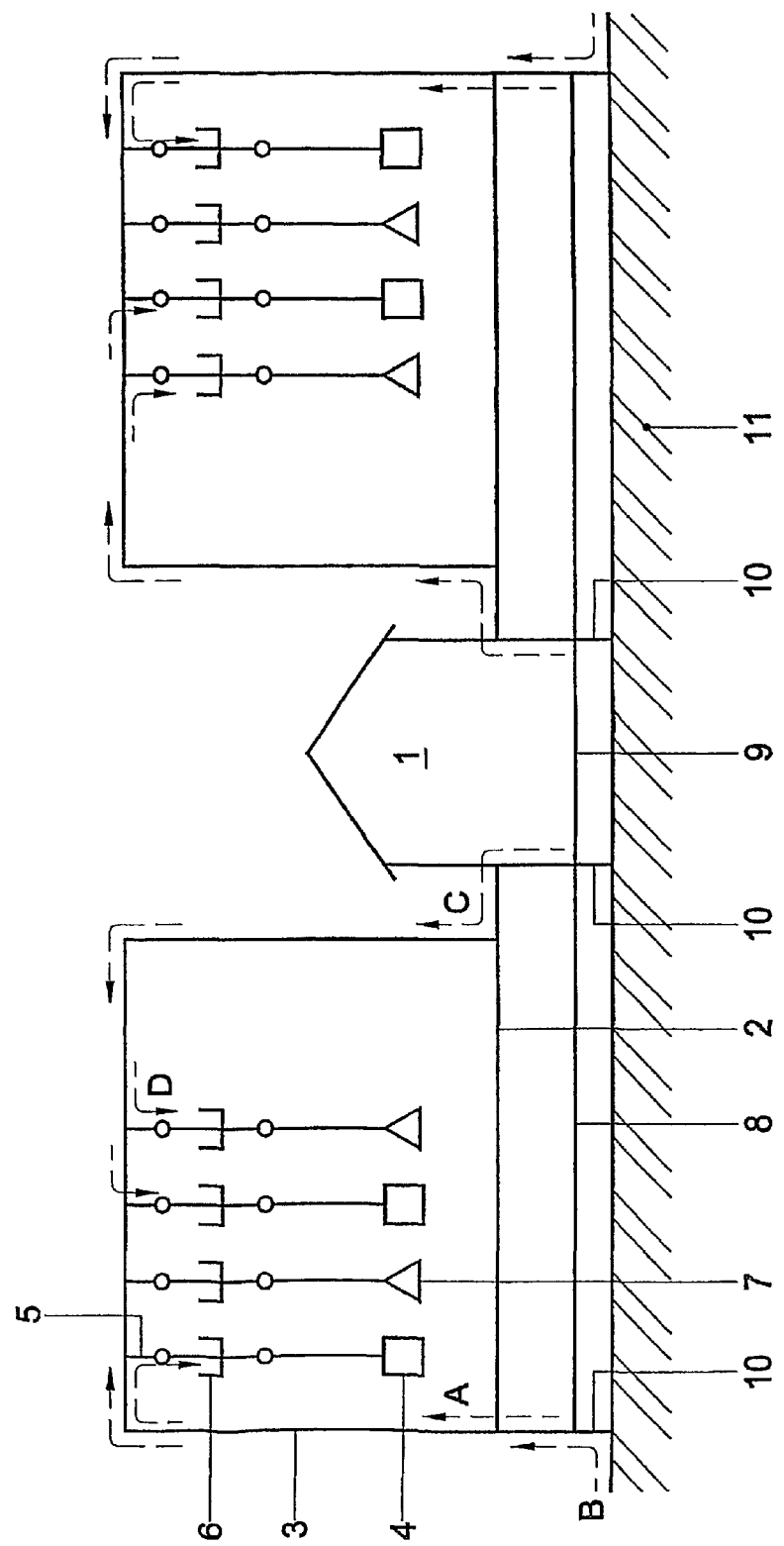
FIG. 1a shows a laying nest having on both sides a portal frame in which the poultry support means are suspended from a number of connections which are each provided with a poultry lice trap.
Figure 1B:
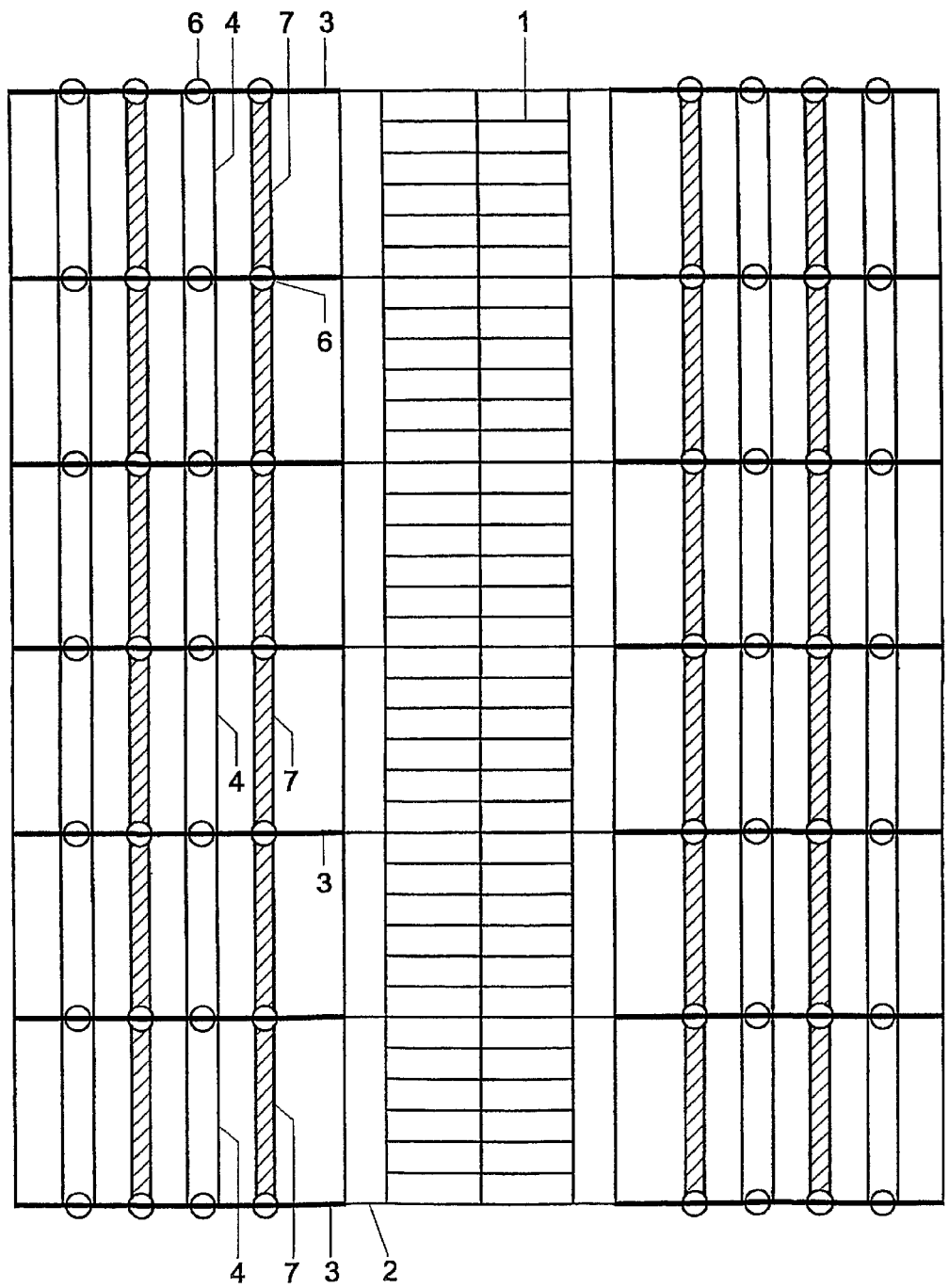

FIG. 1 shows a laying nest 1 provided, on either side, with a bin with grids 2, having portal frames 3 thereon, in which the poultry support means 4 are suspended from a number of connections 5, with a trap included in each connection. FIG. 1 also shows hanging nipple drinkers and feeding troughs 7, as schematically represented. With the aid of supports 10, manure belt 8 and a floor of the laying nest 9 rest on the ground or floor 11. With the aid of arrows, it is indicated which routes the poultry louse can travel, crawling, to get to the chickens. From the grid 2 or the manure belt 8, a possible route A is indicated via which the poultry louse eventually ends up in the poultry lice trap 6. From the fixed world, in this case the ground 11 under the manure belt 8 or the free-range area, a possible route B is indicated, but, also from this direction, the poultry louse eventually ends up in the poultry lice trap 6. Naturally, the poultry louse could also try to get to the sleeping chickens via the laying nest 1. Possible route C, however, will also have the poultry louse end up in a poultry lice trap 6. Finally, the poultry louse could try to reach the nipple drinkers and the feeding troughs 7, so as to crawl from there to the chickens the moment something is drunk or eaten. However, via this possible route D, the poultry louse also ends up in a poultry lice trap 6, even before the nipple drinkers and feeding troughs 7 are reached.

It is clear that all routes to the chickens, to be travelled in a crawling manner, have the poultry lice end up in a poultry lice trap 6.

Figure 3:
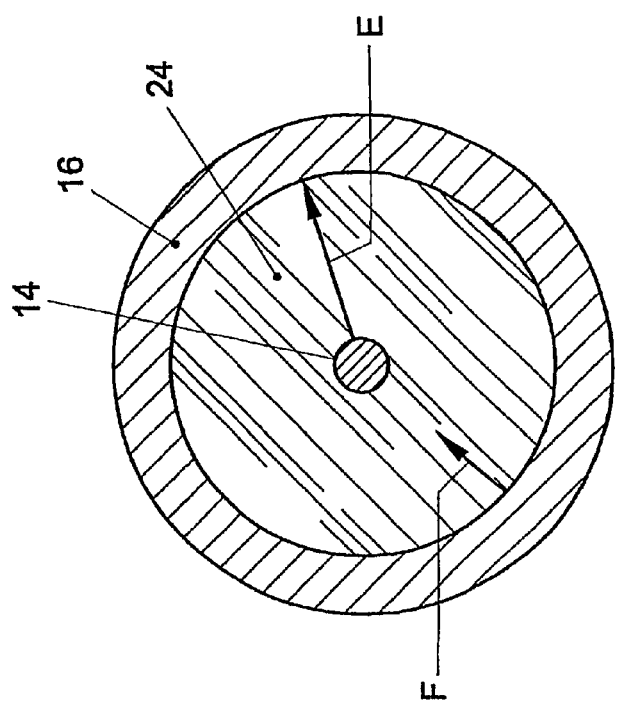
FIG. 3 is a cross section of the poultry lice trap at the position O—O in FIG. 2.
Figure 2:
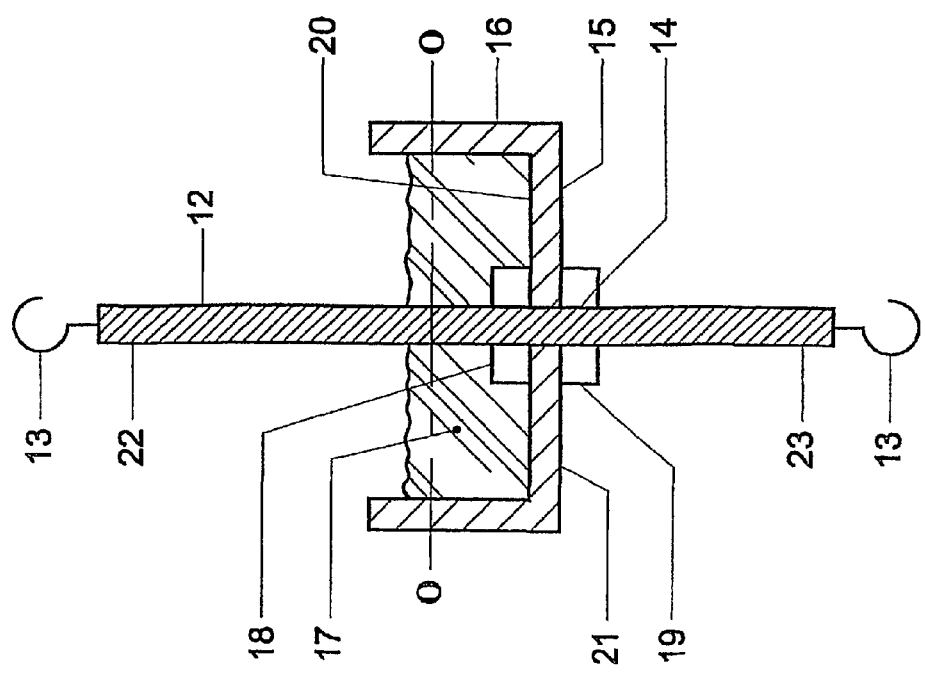
FIG. 2 shows a poultry lice trap provided with hooks for a suspended connection.
Figure 4:
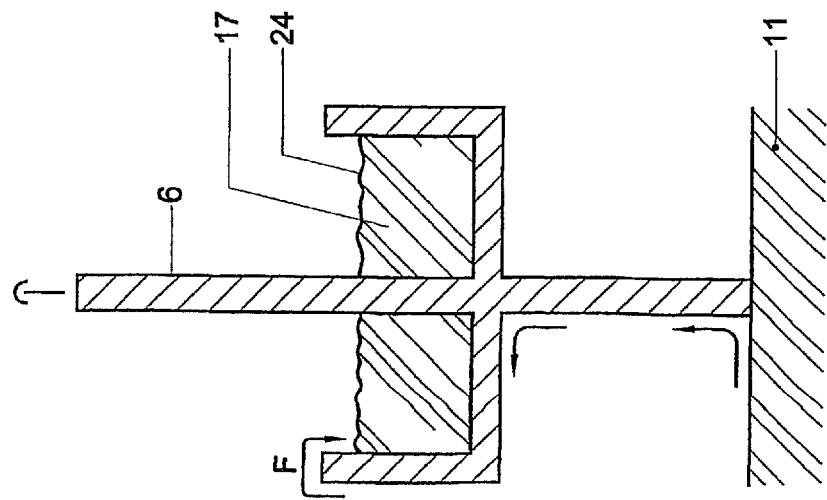
FIG. 4 shows a poultry lice trap in a standing connection with the fixed world.

FIG. 2 shows a cross section over the longitudinal axis of a poultry lice trap, comprising an elongated part 12, to which, on both extremities, connecting elements 13 are connected, consisting, in this example, of hooks, while the middle part 14 is surrounded on all sides with a surface 15, perfectly contiguous to the middle part 14, which surface has a raised edge If, formed such that, in that manner, a basin 17 containing poultry lice pesticide is formed. Optionally, sealing rings 18 and 19 can be provided on the inside 20 and the outside 21, respectively, of the basin containing poultry lice pesticide 17, in closing contact with the middle part 14 of the elongated part 12, to exclude that crawling vermin, such as poultry lice, crawl along the middle part 14 of the elongated part 12 without crawling over the inside 20 and outside 21 of the poultry lice pesticide containing basin 17. A poultry louse wanting to crawl from the upper side 22 to the lower side 23 where the chickens are present inevitably ends up in the basin 17 containing poultry lice pesticide, where it dies and hence is not able to crawl further to the chickens. Thus, the chickens are screened from the poultry lice. In FIG. 3, a top plan view of the poultry lice trap, it is indicated with route E how the poultry louse must inevitably crawl through the poultry lice pesticide 24 to get to the edge 16. Also, when the poultry lice trap 6 is provided in, for instance, the supports 10 between the floor 11 and the manure belt 8, as is represented in FIG. 4, also shown as a cross section over the longitudinal axis, while the coupling pieces contain, for instance, snap-in elements instead of hooks, and therefore the poultry louse has to crawl from the floor upwards to get closer to the chickens, the poultry louse inevitably ends up in the poultry lice pesticide 24. This route has been indicated as route F.

Figure 5:
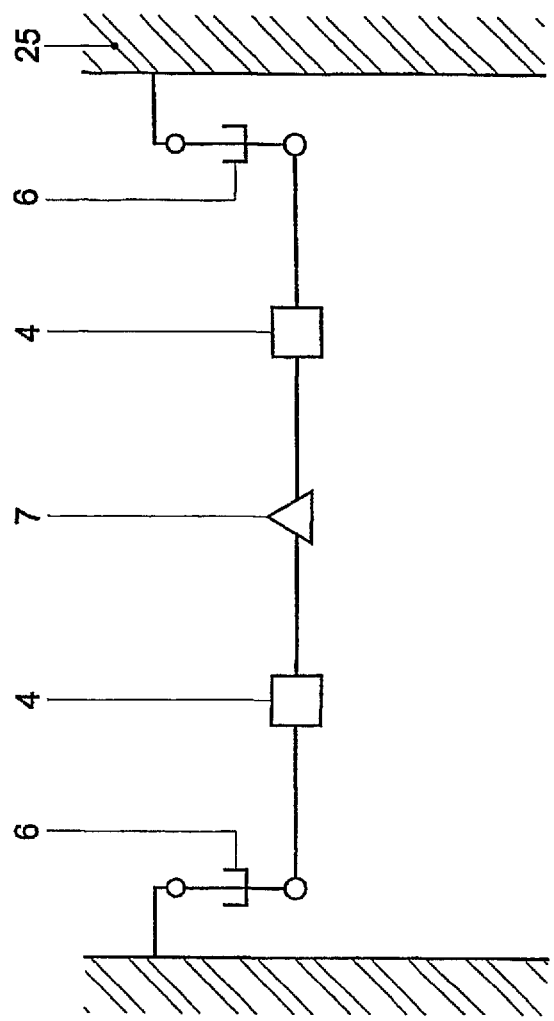
FIG. 5 shows poultry support means connected, on either side, to the fixed world, in a suspended manner, with connections which are each provided with a poultry lice trap.

Other positions for the poultry lice trap are also conceivable. FIG. 5 illustrates a situation where the poultry support means 4 are suspended from the fixed world, for instance between walls 25. Here, in each connection 5 a poultry lice trap is included, and the poultry louse, coming from a wall side, once again inevitably ends up in the poultry lice trap 6.

In a special embodiment of the invention, in which, as is indicated in FIG. 1, the poultry support means are suspended from a cable or chain, the construction is dimensioned such that the shortest route for the poultry louse to cover in a crawling manner to the poultry lice trap or to the poultry support means, is more than 15 meters. This distance corresponds to the path a poultry louse can travel at most during a night, so that the poultry louse cannot even come in the direct vicinity of the chickens. In this construction, the poultry lice trap is provided to eliminate the few possible poultry lice able to cover an exceptionally long route in a crawling manner.

Figure 6:
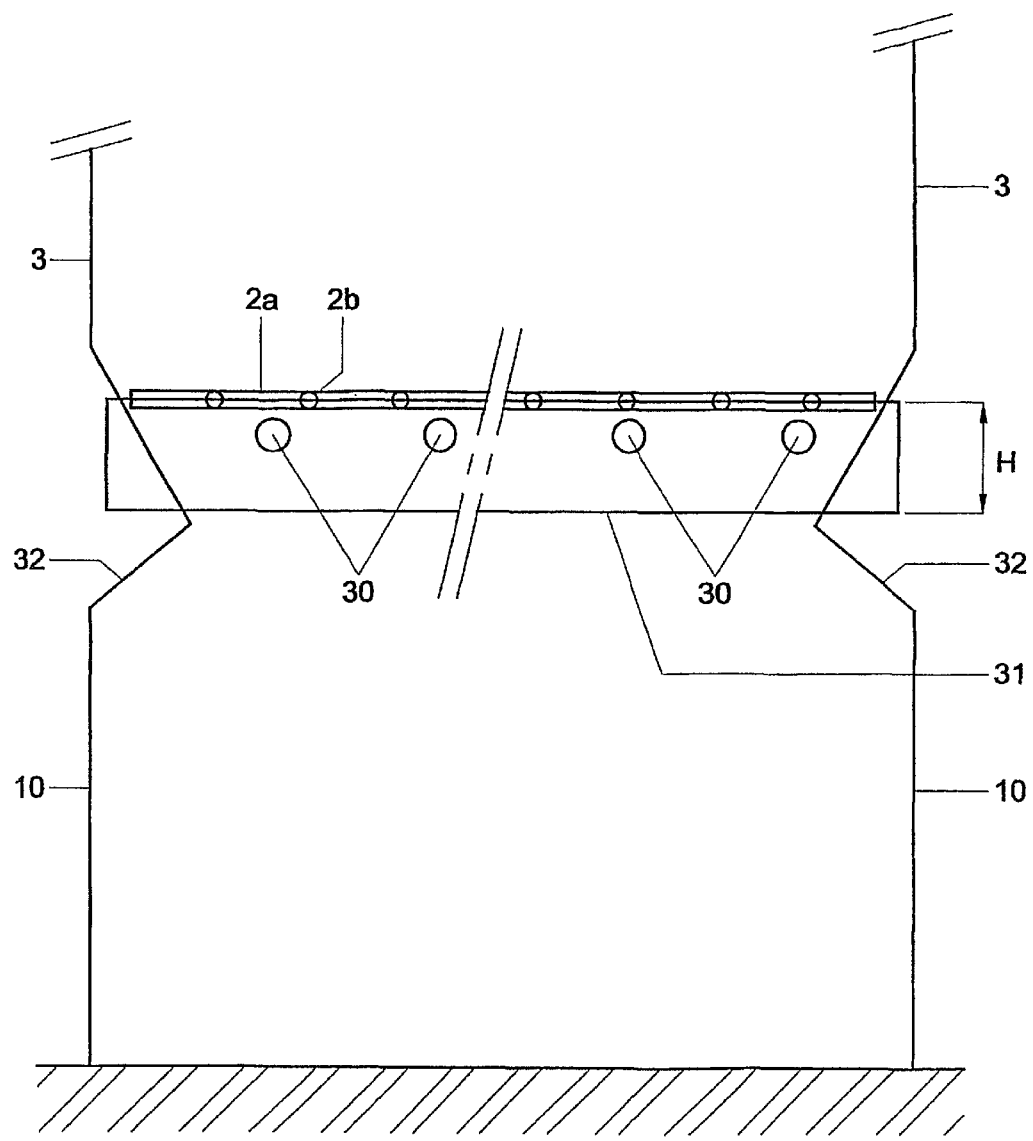
FIG. 6 shows in more detail the manner in which the grids are supported.

Further, in a special embodiment of the invention, all parts from which the apparatus is built up, notably the free-range area and the poultry support means, are manufactured such and assembled in such a well-fitting manner, that, during the daytime, the chickens can free the environment from poultry lice in that the poultry lice cannot hide in cracks and the like, Reference is made to FIG. 6, in which, in more detail, the manner of support of the grids 2 is shown. Each grid 2 is provided with mutually interconnected crossbars 2a and longitudinal bars 2b. The grids are of a particularly light design, approximately in the manner in which grates in a refrigerator are designed. The grids 2 rest on longitudinal rods 30 extending in a longitudinal direction of the apparatus. The longitudinal rods 30 are mounted in cross strips 31, which cross strips rest in longitudinal profiles 32, which have a triangular shape. The longitudinal profiles 32 extend in a longitudinal direction of the apparatus and are connected to the portal frames 3. In the longitudinal profiles 32, spaced apart from each other, recesses are provided in which the cross strips 31 rest. The extremities of the cross strips 31 therefore reach through the longitudinal profiles 32 and can be taken therefrom in a simple manner. The triangular longitudinal profiles 32 offer the advantage that the chickens can easily reach the surfaces thereof with their legs so as to clean them. Thus, not only poultry lice but also dirt which holds poultry lice can be removed by the poultry. Preferably, the height H of the cross strips 31 is such that the chickens can reach the lower side of these cross strips 31 with their legs, so that during the daytime, the chickens can also completely free the supports of the grids 2 from poultry lice. In this manner, formation of clusters of poultry lice underneath the grids 2 is prevented. It is noted that such a support of the grids, which can be cleaned by the chickens themselves, can also be used in an apparatus whose connections of the poultry support means are not provided with a poultry lice trap.

In this special embodiment of the invention, the apparatus is further provided with manure discharge belts which are provided underneath the grids 2, so that manure is daily removed from the coop and the ammonia emission is minimized.

The poultry lice trap 6 can be composed from parts as indicated in FIG. 2, but in a special embodiment can also be manufactured from one material, as represented in FIG. 4.

The invention is not limited to screening chickens from poultry lice. Also other crawling vermin and other species of animals than poultry can, with the aid of the invention, remain separated from each other. It is also possible that the invention comprises another crawling vermin elimination mechanism, such as locally heating the inevitable route for the crawling vermin to a temperature at which the crawling vermin dies.

All these variants, but also variants not shown and not mentioned, are understood to fall within the scope of the invention.

What is claimed is:

1. An apparatus intended for keeping poultry, provided with poultry support means (4) an which the poultry, at least at night, roosts, wherein the poultry support means (4) are connected to the fixed world (11) via at least one connection (3, 5, 10), wherein each connection (5) comprises a trap (6) for crawling vermin, such as, for instance, poultry lice, so that poultry present on the poultry support means (4) is screened from the crawling vermin, characterised in that at least the poultry support means (4) are provided with properly abutting smooth surfaces manufactured such and assembled in such a manner that the poultry itself can effectively keep them free of crawling vermin, wherein underneath the poultry support means, grids (2) are provided, which grids (2) rest on longitudinal rods (30) extending in the longitudinal direction of the apparatus, which longitudinal rods (30) are mounted in cross strips (31), which cross strips (31) rest in longitudinal profiles (32), having a triangular shape, which longitudinal profiles (32) extend in the longitudinal direction of the, apparatus and are connected to the portal frames (3), while in the longitudinal profiles (32) spaced apart recesses are provided in which the cross strips (31) rest, so that the cross strips (31) are easily detachable from the longitudinal profiles (32), wherein the height (H) of the cross strips (31) is such that the poultry can reach the underside of these cross strips (31) with their legs.

2. An apparatus according to claim 1, characterized in that the apparatus is provided with drinking and feeding troughs (7) for the poultry, which are connected to the fixed world via at least one connection (5), and in each connection (5) a trap (6) is included for crawling vermin.

3. An apparatus according to claim 1, characterized in that the connection (5) is formed by a cable, chain or bar, from which the poultry support means (4), the drinking troughs and or any feeding troughs (7) are suspended.

4. An apparatus according to claim 1, characterized in that the connection (3) is formed by a bar on which the support means rest.

5. An apparatus according to claim 1, characterized in that the trap (6) comprises an inevitable route (E, F) for the crawling vermin to the poultry, arranged for killing the crawling vermin.

6. An apparatus according to claim 1, characterized in that the trap (6) comprises an inevitable route (E, F) for the crawling vermin to the poultry, provided with a pesticide (24) for crawling vermin.

7. An apparatus according to claim 1, characterized in that the trap (6) comprises an inevitable route for the crawling vermin, provided with elements for heating this route to a temperature at which the crawling vermin dies.

8. An apparatus according to claim 1, wherein the trap comprises an elongated middle part (12) whose ends are provide with coupling pieces (13), the middle part (12) being surrounded on all sides by a surface (15) perfectly contiguous to the middle part, on which surface (15) pesticide for crawling vermin (24) has been provided and over which the crawling vermin has to move to get from one end (13) of the elongated middle part (12) to the other end (13) of the elongated middle part (12).

9. An apparatus according to claim 1, characterized in that underneath the poultry support means (4), manure conveyor belts are present for removing manure.

10. An apparatus according to claim 1, wherein said crawling vermin are poultry lice.

11. An apparatus according to claim 2, wherein the crawling vermin are poultry lice.

* * * * *